United States Patent

[11] 3,618,632

| [72] | Inventor | Frederick F. Stevens<br>Sandy Hook, Conn. |
|---|---|---|
| [21] | Appl. No. | 850,313 |
| [22] | Filed | July 31, 1969 |
| [45] | Patented | Nov. 9, 1971 |
| [73] | Assignee | Hoff-Stevens, Inc.<br>Ansonia, Conn.<br>Continuation-in-part of application Ser. No.<br>661,079, Aug. 16, 1967, now abandoned. |

[54] CHECK VALVE
8 Claims, 9 Drawing Figs.

[52] U.S. Cl............................................ 137/515.7,
137/525.1
[51] Int. Cl................................................. F16k 15/14
[50] Field of Search.......................................... 137/525.1,
515, 515.7

[56] References Cited
UNITED STATES PATENTS

| 996,588 | 6/1911 | Kennedy | 137/525.1 X |
| 3,060,882 | 10/1962 | Peters et al. | 137/525.1 X |
| 3,131,712 | 5/1964 | Risley et al. | 137/525.1 X |

*Primary Examiner*—Robert G. Nilson
*Attorney*—McCormick, Paulding & Huber

ABSTRACT: A fluid check valve having a hollow elongated self-supporting nipple supported in a path of fluid flow and made from a resilient deformable material. A slit through the closed upstream end of the nipple divides it into adjacent sections which are laterally displaced from each other to provide a path of fluid flow therebetween when the fluid pressure on the downstream side of the nipple exceeds the fluid pressure on the upstream side thereof. Under the influence of back pressure the sections resiliently press against each other to prevent reverse fluid flow therebetween. The nipple has an integral part which supports it in a fixed position in an associated conduit member and also forms a seal between the latter member and another conduit member connected thereto. A rigid nipple insert may be provided to prevent inward collapse or deformation of the nipple due to fluid back pressure.

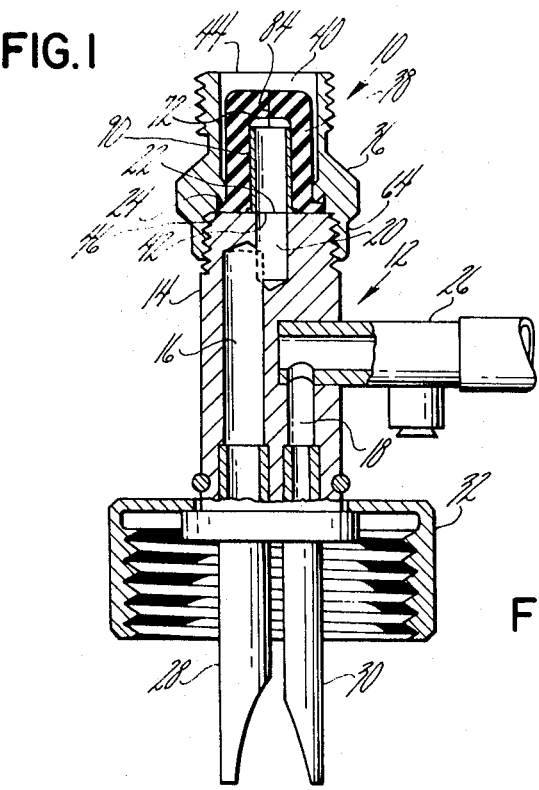
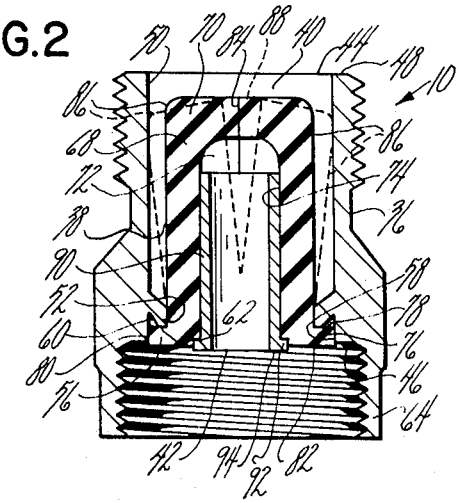
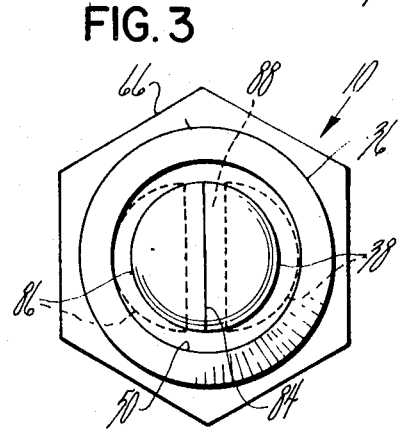
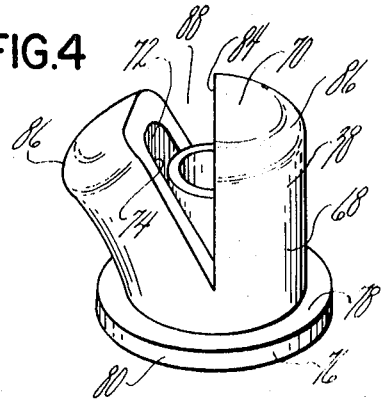
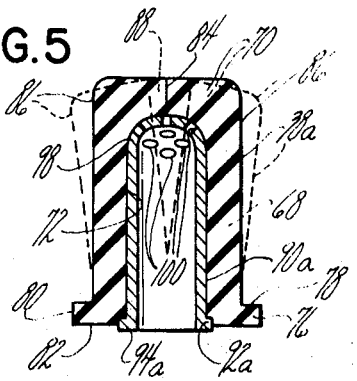
INVENTOR.
FREDERICK F. STEVENS Jr.

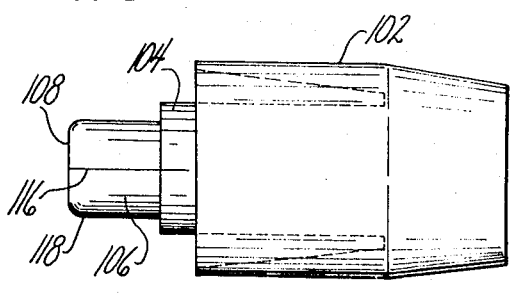
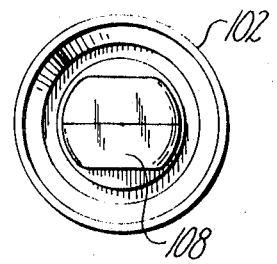
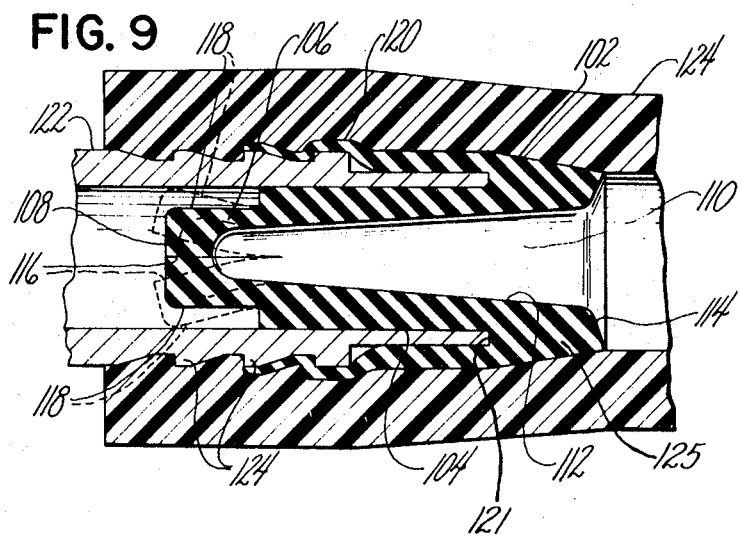
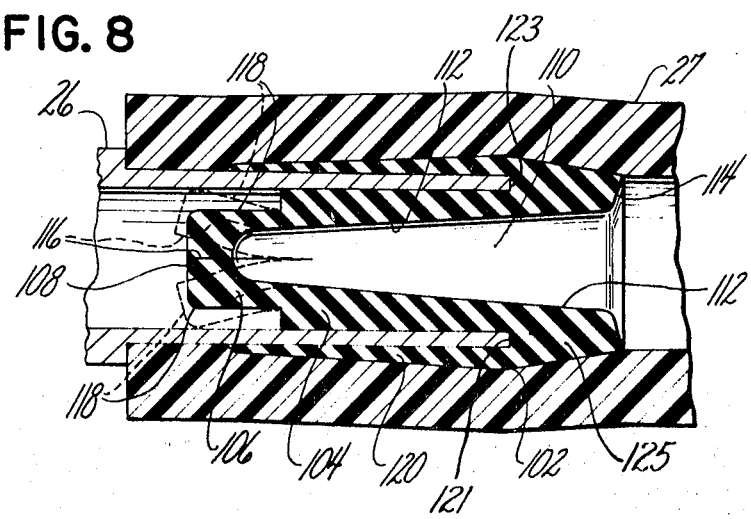

3,618,632

CHECK VALVE

CROSS REFERENCE

This is a continuation-in-part of application Ser. No. 661,079, filed Aug. 16, 1967, now abandoned.

BACKGROUND OF INVENTION

This invention relates in general to check valves and deals more particularly with pressure-responsive check valves of resilient deformable type.

The device of the present invention has particular utility with regard to key-tapping apparatus of the type used for tapping or drawing of beer from the kegs in which it is conventionally stored and shipped. For this reason reference is made to this specific application; however, it should be understood that there is no intention to limit the invention to this use and that in many instances it may be used to advantage with other fluid transporting or dispensing apparatus.

In some keg-tapping installations the tapping faucet may be located a considerable distance above its associated keg, as, for example, where kegs are kept in the basement of a tavern. The present check valve serves as an auxiliary unit to the tapping apparatus and is located in the tapping line near the keg to prevent reverse flow of beer from the line when the tapping apparatus is disconnected from the keg as when changing kegs.

SUMMARY OF THE INVENTION

In accordance with the present invention a resilient unitary check valve is provided of simple durable construction for use with a pair of conduit members adapted to be connected together to provide a continuous fluid passageway. The check valve has a valve element including an integrally formed part which cooperates with the members to support the element in an operational position within one of the members to effect a sanitary seal between the members.

BRIEF DESCRIPTION OF THE DRAWINGS

FIG. 1 is a vertical sectional view taken through a check valve embodying the present invention assembled with a part of a keg-tapping apparatus.

FIG. 2 is a somewhat enlarged vertical sectional view of the check valve of FIG. 1.

FIG. 3 is a somewhat enlarged plan view of the check valve of FIG. 1.

FIG. 4 is a perspective view of the valve element of FIG. 1, a portion of the element being laterally displaced to reveal the insert positioned therein.

FIG. 5 is a vertical sectional view taken through another valve element embodying the present invention.

FIG. 6 is a side elevational view of still another valve element embodying the present invention.

FIG. 7 is a left end view of the valve element of FIG. 6.

FIG. 8 is a somewhat enlarged vertical sectional view through the valve element of FIG. 6 and shows the element in assembly with a pair of conduit members which comprise a part of the tapping apparatus of FIG. 1.

FIG. 9 is generally similar to FIG. 8, but shows the valve element in assembly with another pair of conduit members.

BRIEF DESCRIPTION OF PREFERRED EMBODIMENTS

Turning now to the drawing a check valve assembly embodying the present invention and indicated generally at 10 is shown in FIG. 1 attached to a part of a keg-tapping device or tavern unit 12 generally similar to the tavern unit shown in U.S. Pat. No. 3,228,413, issued Jan. 11, 1966, and entitled, "Key Tapping Device." The tavern unit is in turn arranged for connection with a key unit (not shown) which is adapted to be permanently or semipermanently secured in the tapping opening of a keg or other container of the type conventionally used in storing and shipping beer or other liquids under pressure. The tavern unit 12 comprises a conduit member which includes a cylindrical body 14 having two passageways 16 and 18 therein. The passageway or bore 18 is laterally offset from the body central axis and at its upper end communicates with a short bore 20 coaxial with the body axis and terminating in a discharge opening 22 surrounded by an upwardly facing bearing or seating surface 24. At its upper end the bore 18 communicates with an opening through the wall of the short tube 26 which extends from the body 14 and receives a flexible hose 27 through which pressurized air is applied to the keg.

Communication between the passageways and the keg is provided by two tubular probes 28 and 30, respectively, extending from the passageways 16 and 18 and adapted to communicate with bores in the keg unit when the tavern unit is connected with the keg unit. The probe 28 and the passageways 16 and 20 cooperate to provide a path for fluid flow from the keg to the discharge opening 22. At its upper end the body 14 is externally threaded. A union nut 32 on the lower end of the body 14 serves to secure the tavern unit 12 to the keg unit. For a further description of the tavern unit and the manner in which it cooperates with the keg unit reference may be had to the aforementioned patent.

Considering now the check valve in detail and referring particularly to FIGS. 2–4, it will be noted that the valve assembly 10 essentially comprises a conduit member or a hollow housing 36 containing a resilient valve element or nipple 38. The housing 36 may take various forms, but preferably and as shown it is generally cylindrical and has a passageway 40 extending therethrough providing an inlet opening 42 and an outlet opening 44. A downwardly facing annular seating surface 46 surrounds the inlet opening 42 and a generally similar but upwardly facing seating surface surrounds the outlet opening 44. The passageway 40 is preferably defined by a cylindrical bore having an enlarged portion 50 in the upper end of the housing and a reduced or smaller diameter portion 52 in the vicinity of the inlet opening 42. Below the bore portion 52 is an inwardly and downwardly opening annular recess 56 defined by another enlarged cylindrical bore portion 58 and a downwardly and inwardly converging conical seating surface 60 terminating in a substantially flat radial shoulder 62 axially upwardly spaced from the annular seating surface 46.

To releasably hold the check valve in connected relationship with the tavern unit 12 the valve housing 36 at its lower end includes a generally cylindrical portion 64 extending downwardly from the annular seating surface 46 and provided with internal threads for threadably engaging the externally threaded upper end portion of the tavern unit. Tightening or loosening of the housing with respect to the tavern unit 12 is facilitated by a generally hexagonal central portion 66 on the housing adapted to receive a wrench, as best shown in FIG. 3. To permit connection with a conduit or beer line (not shown) the housing 36 is externally threaded at its upper end.

The resilient nipple 38 may be made in various forms but preferably it is generally cylindrical and made from a suitable elastomeric material such as rubber. It includes a generally cylindrical sidewall 68 and an end wall 70 defining an axially elongated cavity 72 preferably defined by a smooth cylindrical bore 74. The end wall 70 is generally arch-shaped when viewed in an axial plane, as it appears in FIGS. 1 and 2 and has a thickness substantially greater than the thickness of the sidewall 68. The outside diameter of the nipple 38 is substantially equal to the diameter of the bore portion 52 so that the latter bore portion serves to coaxially align the nipple with the passageway 40. An integrally formed annular flange 76 surrounds the lower end of the nipple 38 and is received within the recess 56. Referring to FIG. 2 it will be noted that before assembly with the tavern unit 12 the flange 76 has a generally rectangular cross section and includes an upwardly facing annular seating surface 78 engaging the radial shoulder 62, a cylindrical peripheral surface 80 and a downwardly facing flat annular surface 82 spaced downwardly beyond the seating surface 46.

As the check valve 10 is threaded into assembly with the tavern unit 12 the annular shoulder 62 and the conical seating surface 60 cooperate with the tavern unit bearing surface 24 to exert compressive force on the resilient material of the flange 76 disposed therebetween. The arrangement of the conical seating surface 60 causes the material of the flange 76 to be deformed radially outwardly rather than radially inwardly and therefor the deformation of the flange material does not tend to deform the main body of the nipple 38. As previously noted, the housing radial shoulder 62 is in a plane displaced slightly from the plane of the annular seating surface 46 so that the flange 76 cannot be extruded by tightening the valve housing 36 too tightly onto the tavern unit 12. This spacing is in fact so chosen in relation to the thickness of the rubber flange that when the housing 38 is fully tightened onto the tavern unit 12 the annular peripheral surface 80 is brought into sealing engagement with the housing bore portion 58. Sealing engagement is also effected between the flat annular surface 82 and the tavern unit bearing surface 24. Thus the flange 76 serves to both support the resilient nipple 38 in its operational position in the valve housing 36 and to seal the housing in assembly with the tavern unit 12.

Further considering the nipple 38 it will be noted that it has a slit therethrough dividing at least a part of the end wall 70 into adjacent sections. Preferably, a single slit 84 extends axially through the end wall and for some distance downwardly through portions of the sidewall 68 on opposite sides of the cavity 72 dividing the upper or free end portion of the nipple into substantially identical half sections 86, 86. The half sections may be displaced or moved between closed position, shown in full lines in FIGS. 2 and 3, wherein they engage each other and an open position indicated by broken lines in FIGS. 2 and 3. In the open position the half sections are displaced in generally radially opposite directions relative to each other to provide a passageway 88 therebetween through which fluid is constrained to pass in flowing from the inlet opening 42 to the outlet opening 44, displacement of the sections 86, 86 being limited by engagement with the bore wall 50.

The check valve 10 is responsive to change in pressure on opposite sides of the nipple 38. That is to say when fluid pressure on the upstream or inlet side of the nipple and within the cavity 72 exceeds fluid pressure on the downstream or outlet side thereof the sections 86, 86 tend to deform or move radially outwardly to the open position to permit fluid to flow through the resulting passageway 88. Conversely, when fluid pressure on the upstream side of the nipple exceeds pressure on the downstream side thereof the two sections which normally seek the closed position due to the resilience of the nipple material are held in pressing engagement with each other by surrounding fluid to prevent the reverse fluid flow through the nipple 38.

The physical characteristics of the material from which the nipple is made largely determine the operational characteristics of the valve under conditions of varying fluid pressure. It has been found, for example, that a nipple made from a relatively soft rubber will operate satisfactorily under conditions of relatively low fluid back pressures. Where higher back pressures are encountered it may be preferable to make the nipple form a somewhat harder material or to further support or reinforce it to prevent its inwardly deformation or collapse to an open conditions under the influence of back pressure exerted thereon. In the illustrated embodiment 10 an insert or sleeve 90 is provided for this purpose. The use of such a sleeve in conjunction with a nipple of relatively soft rubber has the advantage that the valve will move to a full open position under the influence of a very low forward pressure yet will withstand a very high back pressure while maintaining its closed condition. That is, the sleeve prevents the nipple from deforming or collapsing to an open position under a high back pressure.

The sleeve 90 is generally cylindrical and is received in the cavity 72 and generally complements the undeformed configuration of an associated portion of the bore 74. An annular flange 92 surrounds the lower end of the sleeve and has a flat downwardly facing radial surface 94 adapted to engage the bearing surface 24 when the check valve is assembled with the tavern unit. Before assembly the sleeve flange 92 resides below the nipple flange surface 82 as shown in FIG. 2. As the check valve 10 is brought into assembly with the tavern unit 12 the radial surface 94 engages the bearing surface 24 so that the nipple material immediately above the flange 92 is radially outwardly displaced and compressed thereby tending to urge the radial surface 94 into tight sealing engagement with the bearing surface 24 to effect a sanitary seal therebetween.

Referring now to FIG. 5 another valve element or nipple 38a is shown having an insert or sleeve 90a and adapted for use in a valve having a housing substantially identical to the housing 36 previously described and particularly under conditions of relatively high fluid pressure. The nipple 38a is substantially identical to the previously described nipple 38, however, the sleeve 90a differs somewhat from the previously described sleeve. Specifically the sleeve 90a differs from the sleeve 90 in that it includes an end wall 98 which is preferably dome-shaped and substantially complements the configuration of the associated portion of the nipple end wall 70. At its upper end the sleeve 90a has a plurality of perforations 100, 100 through which fluid may flow. The sleeve 90a permits the upward flow of fluid through the nipple and provides additional support for the resilient member to prevent its collapse under conditions of relatively high back pressure.

In FIGS. 6–8 there is shown still another valve element embodying the present invention and particularly adapted for use with a pair of conduit members adapted to be telescopically connected together to provide a continuous fluid passageway. The valve element indicated by the numeral 102 is shown in assembled relationship with the tube 26 and the flexible hose 27 which comprises a part of the tavern unit 12 of FIG. 1. It is smaller in many respects to the valve element 38, previously described, and has an axially elongated generally cylindrical body 104 with a major diameter at least equal to and preferably slightly greater than the inside diameter of the tube 26 for tightly engaging the inner peripheral surface of the tube in assembly, as shown. The body 104 has a generally cylindrical outlet end portion of reduced diameter and includes a sidewall 106 and an end wall 108 which cooperate to define an axially elongated cavity 110 open at the inlet end of the body. As in the previously described valve element the end wall 108 is generally arch-shaped when viewed in an axial plane, as it appears in FIG. 8, and has a thickness substantially greater than the thickness of the sidewall 106. The cavity 110 is preferably defined by a smooth slightly conical bore 112 which diverges toward the outlet end of the element. The cavity 110 is further defined by a conical inlet opening 114 which communicates with the conical bore 112. A single slit 116 extends axially through the end wall 108 and for some distance through portions of the sidewall 106 on opposite sides of the cavity 110 to divide the outlet end portion of the valve element into two substantially identical half sections indicated at 118, 118. As in the previously discussed valve construction the two half sections 118, 118 are movable in generally radially opposite directions relative to each other between open and closed positions in response to fluid pressure and cooperate in the open position to provide a fluid passageway therebetween. The valve element 102 is constructed and arranged so that the half sections 118, 118 engage the inner peripheral surface of the tube 26 in their fully open or maximum flow position. This arrangement prevents the sections 118, 118 from fluttering or vibrating under condition of maximum flow.

An annular wall or sleeve 120 connected to the body 104 at the inlet end thereof extends for a substantial distance in a generally axial direction toward the outlet end of the valve element. The wall 120 surrounds at least a part of the body and is spaced radially outwardly therefrom to support or retain the valve element in a fixed position within one of the conduit members and for sealing the connection between the two conduit members. A generally radially disposed abutment surface 121 defined by the inlet end portion of the valve element is adapted for engaging an annular bearing surface 123 when the valve element 102 is assembled with the tube 26 to locate the body 104 in a predetermined position in the tube 26. In the illustrated case the valve element body 104 is first inserted in the tube 26 so that the sleeve 120 surrounds the outer peripheral surface of the tube. Thereafter the flexible hose 27, which is made from a resilient material, such as rubber or plastic, is forced over the inlet end of the valve element 102 and over the sleeve 120. In assembly the sleeve 120 provides a fluidtight seal between the hose 27 and the tube 26. If relatively high fluid pressures are to be encountered, it may be desirable, if not necessary, to apply a suitable hose clamp (not shown) to the conduit assembly of FIG. 8. It will be noted that the valve element inlet end portion designated by the numeral 125 is of substantially greater axial extent than the thickness of the tubular sleeve 120 and conically converges from the sleeve 120 in the inlet direction. Thus, the inlet portion 125, in effect, forms an extension of the tube 26 and provides a means for retaining the body 104 in its predetermined position in the tube 26 when the hose 27 is forced over the inlet portion 125 and over the sleeve 120.

In FIG. 9 the valve element 102 is shown in assembly with another pair of conduit members which include a tubular member 122 and a flexible hose 124. The assembly of FIG. 9 is substantially identical to the one previously described except that the tubular member 122 has a plurality of annular rings 124, 124 on the outer peripheral surface thereof arranged in sawtooth fashion which aid in retaining the flexible hose in assembly with the tubular member and the valve element.

I claim:

1. A unitary check valve element formed from elastomeric material and for assembly with a pair of conduit members adapted for telescopic connection to form a continuous fluid passageway, said valve element having an axially elongated body portion of nonuniform wall thickness adapted to be disposed in the passageway and including an inlet end and an outlet end, said valve element including an annular wall integrally connected to said body portion near said inlet end and coaxially extending for a substantial distance in the direction of said outlet end, said annular wall surrounding at least a part of said body portion and spaced radially outwardly therefrom and adapted for surrounding engagement with an associated end portion of the outer peripheral surface of one of the members when said valve element is assembled therewith, means associated with said inlet end and adapted for abutting engagement with the end portion of the one conduit member for positioning said body portion in a predetermined location relative to the one conduit member when the valve element is assembled therewith, said inlet end having an axial extend beyond the end portion of the one conduit member substantially greater than the thickness of said annular wall and comprising means for retaining said body portion in said predetermined location when said annular wall and the associated end portion of the one member are forcibly inserted into an end portion of the other of the conduit members to effect telescopic connection between the members whereby said body portion is maintained in said predetermined location and the connection between the members is sealed by the annular wall.

2. A unitary check valve as set forth in claim 1 wherein the one conduit member has an inlet opening at one end thereof surrounded by a generally radially disposed bearing surface and said positioning means comprises an annular abutment surface defined by said inlet end.

3. A unitary check valve as set forth in claim 1 wherein said inlet end has a generally conical configuration converging from said annular wall.

4. A unitary check valve element as set forth in claim 1 wherein said body portion has a sidewall and includes an end wall at said outlet end, said sidewall and said end wall defining an axially elongated cavity open at said inlet end, and said body portion has a slit disposed in one plane and extending in a generally axial direction though said end wall and through portions of said sidewall on generally opposite sides of said cavity, said slit dividing said end wall and at least a portion of said sidewall into adjacent mating sections movable in generally radially opposite directions relative to each other between a closed position wherein said sections engage each other to close said slit and an open position wherein said sections are generally radially displaced from each other to define an aperture therebetween through which fluid is constrained to pass in flowing from said inlet end to and through said cavity.

5. A unitary check valve element as set forth in claim 1 wherein said one plane is an axial plane.

6. A unitary check valve element as set forth in claim 4 wherein said sidewall portion is generally cylindrical, and said end wall is substantially thicker than said sidewall portion and generally arch-shaped as viewed in an axial plane.

7. A unitary check valve as set forth in claim 6 wherein said sidewall portion has a diameter substantially smaller than the diameter of the remainder of said sidewall comprising said outlet end.

8. The combination comprising a pair of telescopically connected fluid conduit members providing a continuous fluid passageway and a unitary check valve element controlling the direction of fluid flow through said passageway and sealing the connection between said conduit members, one of said conduit members having an inlet opening at one end thereof surrounded by a generally radially disposed hearing surface, said check valve made from an elastomeric material and including an axially elongated fluid inlet portion adjacent said one end and defining an annular abutment surface engaging said bearing surface, a fluid outlet portion integrally connected to said inlet portion and axially extending into said one conduit member through said inlet opening, said outlet portion including means defining a fluid check valve, and an annular wall portion integrally connected to said inlet portion and extending in an axial direction therefrom and surrounding an associated portion of the exterior surface of said one conduit, said axially elongated fluid inlet portion extending axially outwardly beyond said bearing surface a distance substantially greater than the thickness of said annular wall portion, said inlet portion, said annular wall portion and said associated portion received in the other of said conduit members, said annular wall portion forming a seal between said one and said other conduit members.

* * * * *

PO-1050
(5/69)

UNITED STATES PATENT OFFICE
CERTIFICATE OF CORRECTION

Patent No. 3,618,632          Dated November 9, 1971

Inventor(s) Frederick F. Stevens

It is certified that error appears in the above-identified patent and that said Letters Patent are hereby corrected as shown below:

```
Col. 1, line 13, "key" should read --keg--,
Col. 1, line 70, "Key" should read --Keg--,
Col, 1, line 71, "key" should read --keg--,
Col. 3, line 59, "form" should read --from--,
Col. 3, line 61, "conditions" should read --condition--,
Col. 4, line 23, "smaller" should read --similar--,
Col. 5, line 50, "extend" should read --extent--,
Col. 6, line 14, "though" should read --through--,
Col. 6, line 25, "1" should read --4--,
Col. 6, line 41, "hearing" should read --bearing--.
```

Signed and sealed this 9th day of May 1972.

(SEAL)
Attest:

EDWARD M. FLETCHER, JR.
Attesting Officer

ROBERT GOTTSCHALK
Commissioner of Patents